United States Patent
Kajiya et al.

(10) Patent No.: US 12,253,449 B2
(45) Date of Patent: Mar. 18, 2025

(54) PHYSICAL PROPERTY MEASUREMENT METHOD, PHYSICAL PROPERTY MEASUREMENT DEVICE, AND PROBE

(71) Applicant: FUJIFILM Corporation, Tokyo (JP)

(72) Inventors: Tadashi Kajiya, Kanagawa (JP); Daisuke Sawai, Kanagawa (JP); Koji Miyata, Kanagawa (JP); Hiroyuki Noda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 256 days.

(21) Appl. No.: 18/051,012

(22) Filed: Oct. 31, 2022

(65) Prior Publication Data

US 2023/0106219 A1 Apr. 6, 2023

Related U.S. Application Data

(63) Continuation of application No. PCT/JP2021/015901, filed on Apr. 19, 2021.

(30) Foreign Application Priority Data

May 1, 2020 (JP) ................. 2020-081131

(51) Int. Cl.
  *G01N 11/00* (2006.01)
  *G01N 11/10* (2006.01)
  *G01N 13/02* (2006.01)
(52) U.S. Cl.
  CPC ............. *G01N 11/10* (2013.01); *G01N 13/02* (2013.01); *G01N 2013/0283* (2013.01)
(58) Field of Classification Search
  None
  See application file for complete search history.

(56) References Cited

U.S. PATENT DOCUMENTS

| | | | | |
|---|---|---|---|---|
| 5,001,923 A | * | 3/1991 | Schmitt-Thomas | ... G01N 13/00 73/335.14 |
| 5,815,256 A | * | 9/1998 | Fukunaga | ............... G01N 13/02 356/138 |

(Continued)

FOREIGN PATENT DOCUMENTS

| | | |
|---|---|---|
| CN | 104406892 | 3/2015 |
| EP | 0377818 | 7/1990 |
| JP | 2500323 | 5/1996 |
| JP | H11160218 | 6/1999 |
| JP | 2010054312 | 3/2010 |

(Continued)

OTHER PUBLICATIONS

English Translation of JP H11-160218 (Year: 1999).*

(Continued)

*Primary Examiner* — Alexander A Mercado
(74) *Attorney, Agent, or Firm* — JCIPRNET

(57) ABSTRACT

Provided are a physical property measurement method, a physical property measurement device, and a probe that can simply measure physical properties of a surface layer portion of an object. A physical property measurement method includes a step of bringing a probe into contact with a surface layer portion of a liquid or gel-like object and maintaining a contact state, a step of measuring a height of the object rising along the probe in contact with the object, and a step of calculating viscous properties or elastic properties of the surface layer portion of the object using the measured height of the object rising along the probe.

11 Claims, 5 Drawing Sheets

(56) References Cited

U.S. PATENT DOCUMENTS

| | | | | |
|---|---|---|---|---|
| 2004/0255650 | A1* | 12/2004 | Moudgil | G01N 13/02 73/64.55 |
| 2010/0188662 | A1* | 7/2010 | Saito | G01N 13/02 356/445 |

FOREIGN PATENT DOCUMENTS

| | | |
|---|---|---|
| KR | 20010074394 | 8/2001 |
| WO | 2009004839 | 1/2009 |

OTHER PUBLICATIONS

Aogaki Ryuichi, "Surface Technology Basics" with English translation thereof, Surface Technology Handbook, 1998, pp. 1-6.

"International Search Report (Form PCT/ISA/210) of PCT/JP2021/015901," mailed on Jun. 22, 2021, with English translation thereof, pp. 1-9.

"Written Opinion of the International Searching Authority (Form PCT/ISA/237)" of PCT/JP2021/015901, mailed on Jun. 22, 2021, with English translation thereof, pp. 1-10.

"Search Report of Europe Counterpart Application", issued on Sep. 29, 2023, pp. 1-9.

Heslot F, "Wettability phenomena applying the 'bath' and 'droplet' measurement methods", Welding International, vol. 12, Issue 1, Jan. 1998, pp. 32-43.

"Office Action of Korea Counterpart Application", issued on May 10, 2024, with English translation thereof, pp. 1-11.

"Partial Search Report of Europe Counterpart Application", issued on Sep. 29, 2023, p. 1-p. 9.

"Search Report of Europe Counterpart Application", issued on Jan. 9, 2024, p. 1-p. 8.

* cited by examiner

PHYSICAL PROPERTY MEASUREMENT METHOD, PHYSICAL PROPERTY MEASUREMENT DEVICE, AND PROBE

CROSS-REFERENCE TO RELATED APPLICATIONS

This application is a Continuation of PCT International Application No. PCT/JP2021/015901 filed on Apr. 19, 2021, which claims priority under 35 U.S.C. § 119(a) to Japanese Patent Application No. 2020-081131 filed on May 1, 2020. Each of the above applications is hereby expressly incorporated by reference, in its entirety, into the present application.

BACKGROUND OF THE INVENTION

1. Field of the Invention

The present invention relates to a physical property measurement method and a physical property measurement device of a liquid or gel-like object and a probe that is used for the physical property measurement method, and more particularly, to a physical property measurement method and a physical property measurement device of a surface layer portion of a liquid or gel-like object and a probe that is used for the physical property measurement method.

2. Description of the Related Art

Mechanical properties of liquids are measured using, for example, a rheometer, a capillary viscometer, or a surface tensiometer. In addition to this, for example, JP2500323B discloses a liquid droplet physical property measurement device that measures a viscosity coefficient in a non-contact manner.

JP2500323B discloses a liquid droplet physical property measurement device including: an input unit that optically inputs a contour image of a liquid droplet in a non-contact manner; an arithmetic unit that consists of a central processing unit (CPU), a working memory, and a data memory; an arithmetic control unit, and an output unit. The arithmetic control unit comprises units for contour calculation, curvature calculation, curvature change calculation, surface tension calculation, volume calculation, and viscosity coefficient calculation. The arithmetic unit performs the contour calculation, the curvature calculation, the curvature change calculation, the surface tension calculation, the volume calculation, and the viscosity coefficient calculation on two-dimensional image data obtained in the input unit by the non-contact optical input of the liquid droplet in response to an instruction from the arithmetic control unit. As a result of the calculation, the output unit outputs a viscosity coefficient along with density and surface tension.

SUMMARY OF THE INVENTION

As described above, the mechanical properties of a liquid are measured by, for example, a rheometer, a capillary viscometer, or a surface tensiometer. The obtained mechanical properties of the liquid are the viscosity or surface tension of the entire liquid (bulk). In addition, in JP2500323B, it is possible to measure a viscosity coefficient in a non-contact manner. The obtained viscosity coefficient is a viscosity coefficient of the entire liquid (bulk).

Any of the above-described measurement methods can be used to obtain the surface tension of the entire liquid, that is, mechanical properties. It is not possible to measure the physical properties of a local region at a depth of about several tens to 100 µm from the surface of a micro liquid droplet or a liquid thin film.

An object of the invention is to provide a physical property measurement method, a physical property measurement device, and a probe that can easily measure physical properties of a surface layer portion of an object.

In order to achieve the above object, according to a first aspect of the invention, there is provided a physical property measurement method comprising: a step of bringing a probe into contact with a surface layer portion of a liquid or gel-like object and maintaining a contact state; a step of measuring a height of the object rising along the probe in contact with the object; and a step of calculating viscous properties or elastic properties of the surface layer portion of the object using the measured height of the object rising along the probe.

Preferably, the probe extends linearly and has a base portion and a tip portion, the tip portion is thinner than the base portion, and the tip portion of the probe is brought into contact with the surface layer portion of the object.

Preferably, a diameter of a thickest part in a portion of the probe which is in contact with the object is equal to or less than ⅓ of a thickness of the surface layer portion of the object.

Preferably, in the probe, a diameter of the tip portion decreases toward a side opposite to the base portion.

Preferably, in the probe, the base portion and the tip portion have a cylindrical shape, and the tip portion is thinner than the base portion.

According to a second aspect of the invention, there is provided a physical property measurement device that measures viscous properties or elastic properties of a surface layer portion of a liquid or gel-like object. The physical property measurement device comprises: a stage on which the object is placed; a probe that comes into contact with the surface layer portion of the object; a driving unit that brings the probe into contact with the surface layer portion of the object and maintains a contact state, or separates the probe from the surface layer portion; a measurement unit that measures a height of the object rising along the probe in contact with the object; and a calculation unit that calculates the viscous properties or elastic properties of the surface layer portion of the object using the height of the object rising along the probe measured by the measurement unit. A tip portion of the probe has a part whose diameter is equal to or less than 33 µm.

Preferably, the probe extends linearly and has a base portion that is provided continuously with the tip portion, and a diameter of the tip portion decreases toward a side opposite to the base portion.

Preferably, the probe extends linearly and has a base portion that is provided continuously with the tip portion, the base portion and the tip portion have a cylindrical shape, and the tip portion is thinner than the base portion.

According to a third aspect of the invention, there is provided a probe that is used to measure viscous properties or elastic properties of a surface layer portion of a liquid or gel-like object. The probe comprises a tip portion that has a part whose diameter is equal to or less than 33 µm.

According to the invention, it is possible to easily measure the physical properties of a surface layer portion of an object. In addition, a probe that is used to measure physical properties of a surface layer portion of an object is provided.

DESCRIPTION OF THE PREFERRED EMBODIMENTS

Hereinafter, a physical property measurement method, a physical property measurement device, and a probe according to the invention will be described in detail on the basis of preferred embodiments illustrated in the accompanying drawings.

In addition, the drawings described below are illustrative examples for describing the invention, and the invention is not limited to the drawings described below.

In addition, in the following description, "to" indicating a numerical range includes numerical values described on both sides. For example, ε of a numerical value α to a numerical value β indicates that the range of ε is a range including the numerical values α and β and is represented by α≤ε≤β using mathematical symbols.

Angles, such as "perpendicularity" and "orthogonality", include error ranges that are generally allowed in the corresponding technical field unless otherwise specified.

Hereinafter, physical property measurement method and a physical property measurement device will be described.

Figure 1:
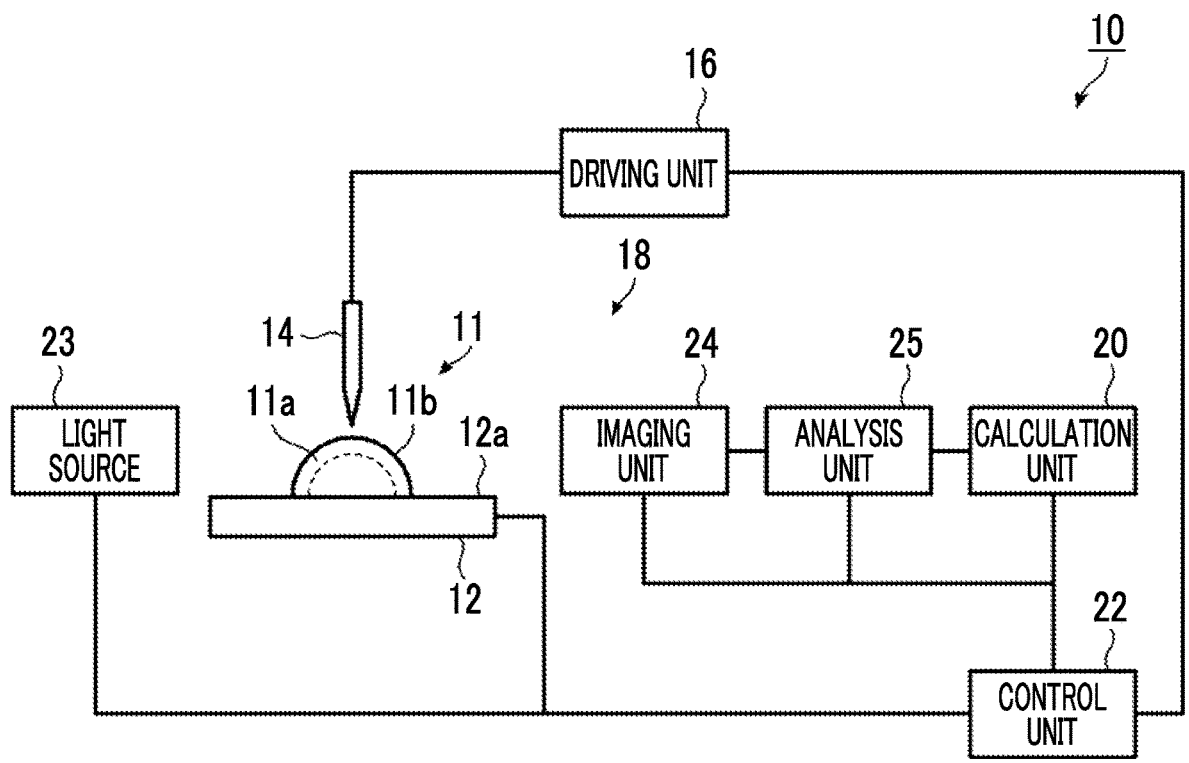
FIG. 1 is a schematic diagram illustrating an example of a physical property measurement device that is used in a physical property measurement method according to an embodiment of the invention.
Figure 2:
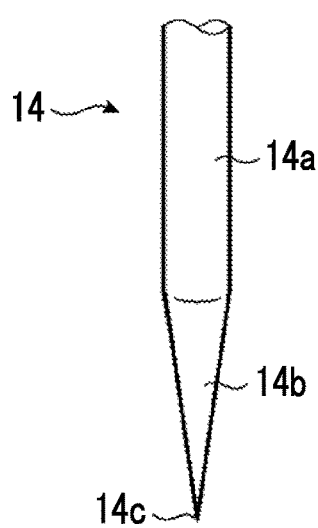
FIG. 2 is a schematic diagram illustrating an example of a probe that is used in the physical property measurement method according to the embodiment of the invention.

FIG. 1 is a schematic diagram illustrating an example of the physical property measurement device that is used in a physical property measurement method according to an embodiment of the invention. FIG. 2 is a schematic diagram illustrating an example of a probe that is used in the physical property measurement method according to the embodiment of the invention.

In addition, the physical property measurement device used in the physical property measurement method is not limited to the physical property measurement device illustrated in FIG. 1, and the probe is not limited to the probe illustrated in FIG. 2. The physical property measurement method is a method for measuring viscous properties or elastic properties of a surface layer portion of a liquid or gel-like object. The object is not particularly limited as long as it is a liquid or gel-like object.

Here, liquid is defined as having an elastic modulus which is so small that it is not capable of being detected by a standard measurement method. A material having an elastic modulus of less than 0.1 Pa is called liquid. The "gel-like object" means an object having an elastic modulus of about 10 Pa to 10 kPa.

<Physical Property Measurement Device>

For example, a physical property measurement device 10 illustrated in FIG. 1 includes a stage 12 on which an object 11 is placed, a probe 14 that comes into contact with a surface layer portion 11a of the object 11, a driving unit 16 that brings the probe 14 into contact with the surface layer portion 11a of the object 11 or separates the probe 14 from the surface layer portion 11a, a measurement unit 18 that measures the height of the object 11 rising along the probe 14 in contact with the object 11, and a calculation unit 20 that calculates the viscous properties or elastic properties of the surface layer portion 11a of the object 11 using the height of the object 11 rising along the probe 14 measured by the measurement unit 18.

The physical property measurement device 10 includes a control unit 22 that controls the stage 12, the driving unit 16, the measurement unit 18, and the calculation unit 20.

The object 11 is placed on a surface 12a of the stage 12 as described above.

For example, the stage 12 is movable in three directions such that the position of the probe 14 with respect to the object 11 can be adjusted.

In addition, the three directions are, for example, a direction perpendicular to the surface 12a and two directions orthogonal to each other in the surface 12a.

For example, it is preferable that the position of the probe 14 in the direction perpendicular to the surface 12a of the stage 12 can be controlled on the order of μm.

For example, a material forming the surface 12a of the stage 12 is not particularly limited. In a case in which the object 11 has a liquid droplet shape, the surface 12a needs to have a surface energy that prevents the object 11 from wetting and spreading.

The probe 14 is used to measure the viscous properties or elastic properties of the surface layer portion of the liquid or gel-like object. The probe 14 is used for the physical property measurement device 10 and the physical property measurement method. The probe 14 comes into contact with the surface layer portion 11a of the object 11 as described above. The object 11 rises along the probe 14 and moves along a surface of the probe 14.

A tip 14c of the probe 14 has, for example, a sharp needle shape. For example, as illustrated in FIG. 2, the probe 14 extends linearly and has a base portion 14a and a tip portion 14b. In the probe 14, the tip portion 14b is thinner than the base portion 14a. In the probe 14, the base portion 14a and the tip portion 14b are continuous, and the base portion 14a is provided continuously with the tip portion 14b.

The tip portion 14b of the probe 14 is brought into contact with the surface layer portion 11a of the object 11, and a contact state is maintained during physical property measurement. Specifically, for example, the probe 14 is configured such that the base portion 14a has a cylindrical shape and the diameter of the tip portion 14b decreases toward a side opposite to the base portion 14a. The probe 14 penetrates the surface layer portion 11a of the object 11 from the tip 14c of the tip portion 14b, and the tip portion 14b of the probe 14 is kept in contact with the surface layer portion 11a of the object 11.

The probe 14 is made of, for example, tungsten and has the tip portion 14b formed by electropolishing. A method for forming the tip portion 14b is not limited to electropolishing. However, electropolishing is preferable to form a smooth surface.

It is preferable that the probe 14 has high surface energy. For example, it is preferable that the surface energy is equal to or greater than 100 mN/m. The probe 14 can be made of, for example, glass in addition to the above-mentioned tungsten. In addition, it is preferable that the probe 14 is made of, for example, metal because the tip portion 14b is manufactured by electropolishing. The probe 14 can be made of, for example, platinum iridium, titanium, and iron in addition to the above-mentioned tungsten.

Further, it is preferable that the curvature of the tip 14c of the tip portion 14b of the probe 14 is equal to or less than 10 μm. For the curvature of the tip 14c, for example, an image of the tip 14c is acquired, a circle is fitted to the tip 14c in the image, and the diameter of the circle that is best matched with the tip 14c is used as the curvature of the tip 14c.

Furthermore, it is preferable that the tip portion 14b of the probe 14 has a smooth surface. For example, it is preferable that the surface of the tip portion 14b has an unevenness of about 100 nm.

It is preferable that the base portion 14a of the probe 14 has a diameter of 400 to 600 μm in terms of good rigidity, no bending, ease of fixation onto the stage 12, and efficiency of electropolishing.

It is preferable that the total length of the probe 14 is 2 to 4 cm in terms of good rigidity, no bending, and ease of fixation onto the stage 12.

Figure 3:
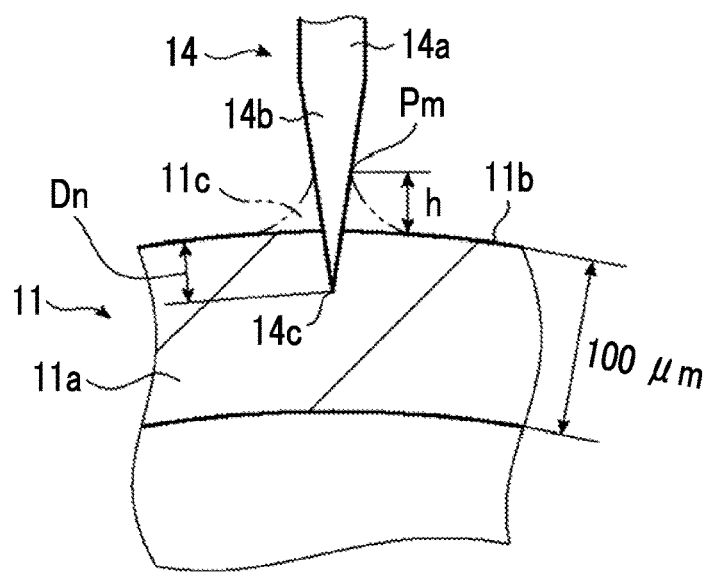
FIG. 3 is a schematic diagram illustrating an object measured by the physical property measurement method according to the embodiment of the invention.

Here, as illustrated in FIG. 3, the surface layer portion 11a of the object 11 is a region within a thickness range of 100 μm from the surface 11b of the object 11. In the physical property measurement method, the tip portion 14b of the probe 14 may penetrate the surface layer portion 11a. In this case, the tip portion 14b of the probe 14 penetrates the surface layer portion 11a to a depth of about ⅒ of the thickness of the surface layer portion 11a. In a case in which the amount of penetration Dn of the probe 14 is ⅒ of the thickness of the surface layer portion 11a of the object 11, it is possible to properly measure the physical properties of the surface layer portion 11a of the object 11, instead of the physical properties of the object 11. In the example illustrated in FIG. 3, since a meniscus 11c rises along the tip portion 14b of the probe 14, it is preferable that the maximum diameter or maximum width of the tip portion 14b of the probe 14 is smaller than that of the surface layer portion 11a of the object 11. Therefore, it is possible to measure the physical properties of only the surface layer portion 11a of the object 11.

In addition, the maximum amount of penetration Dn of the probe 14 is ⅓ of the thickness of the surface layer portion 11a. In this case, the tip portion 14b of the probe 14 penetrates the surface layer portion 11a from the surface 11b of the object 11, and the tip 14c is held at a position of about 33 μm.

Further, the amount of penetration Dn of the probe 14 is preferably equal to or less than ⅕ of the thickness of the surface layer portion 11a and more preferably equal to or less than ⅒ of the thickness of the surface layer portion 11a. The amount of penetration Dn of the probe 14 is also referred to as the amount of press.

In a case in which the amount of penetration Dn of the probe 14 is set to ⅓ of the thickness of the surface layer portion 11a, it is preferable that the tip portion 14b of the probe 14 has a diameter equal to or less than ⅓ of the thickness of the surface layer portion in the thickest portion in a region with which the object 11 comes into contact, from the viewpoint of properly measuring the physical properties of the surface layer portion 11a of the object 11. In this case, the tip portion 14b of the probe 14 has a part with a diameter of 33 μm. In addition, in a case in which the tip portion 14b has the same diameter like a cylinder, the diameter of the tip portion 14b is equal to or less than 33 μm.

The diameter of the probe 14 is preferably equal to or less than 33 μm and more preferably about 10 μm in the thickest portion in the region of the tip portion 14b with which the object 11 comes into contact.

In FIG. 1, the object 11 has a liquid droplet shape, but is not limited to the liquid droplet shape. The object 11 may be a film having a uniform thickness.

The object 11 is not particularly limited and is, for example, a liquid droplet on the order of 100 nanoliters (nl) to microliters (μl). In addition, the lower limit of the size of the liquid droplet is 30 to 40 μm, and the upper limit thereof is not particularly limited.

The object is not limited to being placed on the surface 12a of the stage 12. For example, the object may be accommodated in a container, and the container may be a test tube or the like.

Further, the contact direction of the probe 14 with the object 11 is not limited to the direction perpendicular to the surface 12a of the stage 12 illustrated in FIG. 1. The probe 14 may be brought into contact with the object 11 in a direction parallel to the surface 12a of the stage 12, that is, from the side. Furthermore, the probe 14 may be brought into contact with the object 11 from below. In any contact direction of the probe 14, the object 11 rises along the probe 14 and moves along the surface of the probe 14.

Moreover, the object 11 is not limited to being in contact with the atmosphere. That is, the interface is not limited to an air-liquid interface. For example, a configuration in which liquid comes into contact with the surface 12a of the object 11 may be used. In this case, the interface is an interface between liquids, and a two-layer structure of the object and another liquid is formed. The probe 14 penetrates the interface between the object and another liquid. Then, the probe 14 is brought into contact with the surface layer portion 11a of the object 11.

The driving unit 16 illustrated in FIG. 1 brings the probe 14 into contact with the surface layer portion 11a of the object 11 and maintains the contact state, or separates the probe 14 from the surface layer portion 11a. The driving unit 16 brings the probe 14 into contact with the surface layer portion 11a of the object 11 and maintains the contact state. In this case, the driving unit 16 fixes the position of the probe 14 with respect to the surface layer portion 11a of the object 11.

As described above, the configuration of the driving unit 16 is not particularly limited as long as the driving unit 16 can bring the probe 14 into contact with the surface layer portion 11a of the object 11 and maintain the contact state, or can separate the probe 14 from the surface layer portion 11a. For example, the probe 14 is attached to a fixture (not illustrated) that fixes the probe 14. The driving unit 16 holds the fixture and moves the probe 14. The configuration of the driving unit 16 is not particularly limited, and a known configuration can be appropriately used.

For example, it is preferable that the driving unit 16 can control the position of the probe 14 in the direction perpendicular to the surface 12*a* of the stage 12 on the order of μm.

In addition, the driving unit 16 brings the probe 14 into contact with the surface layer portion 11*a* of the object 11 and maintains the contact state, or separates the probe 14 from the surface layer portion 11*a* of the object 11. However, the present disclosure is not limited thereto. The driving unit 16 may not be provided, and the stage 12 may be used as the driving unit to bring the probe 14 into contact with the surface layer portion 11*a* of the object 11 and to maintain the contact state, or to separate the probe 14 from the surface layer portion 11*a* of the object 11.

Here, bringing the probe 14 into contact with the surface layer portion 11*a* of the object 11 means bringing at least the tip 14*c* (see FIGS. 2 and 3) of the tip portion 14*b* of the probe 14 into contact with the surface 11*b* of the object 11.

Maintaining the contact state means maintaining the contact state of the tip 14*c* of the tip portion 14*b* of the probe 14 (see FIGS. 2 and 3).

Further, as illustrated in FIG. 3, in a case in which the tip portion 14*b* of the probe 14 penetrates the surface layer portion 11*a* of the object 11, maintaining the state in which the tip portion 14*b* of the probe 14 is kept in the surface layer portion 11*a* of the object 11 means maintaining the contact state.

The measurement unit 18 measures the height of the object 11 rising along the probe 14 in contact with the object 11, for example, the height of the object 11 that has risen. The measurement unit 18 has, for example, a light source 23, an imaging unit 24, and an analysis unit 25. The light source 23 irradiates the object 11 and the probe 14 with light. For example, a known light source used for an optical microscope can be used as the light source 23.

The imaging unit 24 images the object 11 and the probe 14 to image a change in the surface layer portion 11*a* of the object 11. The imaging unit 24 has, for example, an objective lens (not illustrated) and an imaging element (not illustrated). The magnification of the objective lens is not particularly limited as long as the object 11 rising along the probe 14 in contact with the object 11 can be imaged in a case in which the probe 14 penetrates the object 11. Further, it is not necessary to provide the objective lens in a case in which the object 11 rising along the probe 14 in contact with the object 11 can be imaged even though there is no objective lens. The imaging element is not particularly limited, and various image sensors, such as a charge coupled device (CCD) image sensor or a complementary metal oxide semiconductor (CMOS) image sensor, can be used.

In addition, the imaging unit 24 has a frame rate of, for example, 30 to 60 frames per second (fps). It is preferable that the frame rate is equal to or greater than 60 fps in order to capture the deformation of the surface layer portion 11*a* of the object in more detail.

In addition, the light source 23 is not necessarily required as long as the imaging unit 24 can image the object 11 and the probe 14 even in a case in which the light source 23 is not provided.

The analysis unit 25 obtains a height h (see FIG. 3) of the object 11 rising along the probe 14 in contact with the object 11, on the basis of the image of the object 11 and the probe 14 obtained by the imaging unit 24, using, for example, image analysis. The height h (see FIG. 3) of the object 11 is the height of the object 11 rising along the probe 14 and is the height of the object 11 that has risen along the probe 14 in the example illustrated in FIG. 3.

The analysis unit 25 extracts the contour of the object 11 from the image (see FIG. 5) of the object 11 and the probe 14 obtained by the imaging unit 24 using, for example, image processing and specifies the meniscus 11*c* as illustrated in FIG. 3. The uppermost point Pm where the meniscus 11*c* comes into contact with the tip portion 14*b* of the probe 14 is specified, and a distance between the point Pm and the surface 11*b* of the object 11 is calculated. The distance between the point Pm and the surface 11*b* of the object 11 is the height h of the object 11 rising along the probe 14 in contact with the object 11.

As illustrated in FIG. 1, the calculation unit 20 calculates the viscous properties or elastic properties of the surface layer portion 11*a* of the object 11, using the height of the object 11 measured by the measurement unit 18.

Here, in a case in which the probe 14 is brought into contact with the object 11, the surface of the object is pulled up by the effect of surface energy (surface tension) to form a meniscus. It is considered that the deformation of the surface of the object which has been pulled up and raised along the probe 14 changes depending on the mechanical properties of the object. In a case in which the probe 14 is brought into contact with a surface of a soft elastic body, the surface is deformed due to competition between surface force and elastic force.

Figure 4:
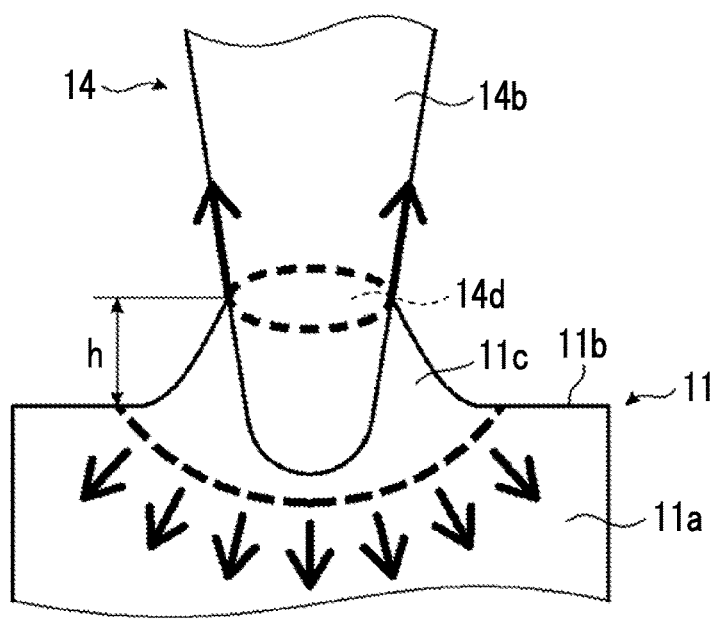
FIG. 4 is a schematic diagram illustrating an elastic body calculation model in the physical property measurement method according to the embodiment of the invention.

From this, as illustrated in FIG. 4, in a case in which the tip portion 14*b* of the probe 14 is brought into contact with the surface layer portion 11*a* of the object 11, the balance between the surface force and the elastic force at the height h of the object 11 rising along the probe 14 in contact with the surface layer portion 11*a* can be expressed by the following expression. In the following expression, a symbol σ is surface tension, a symbol G is a shear modulus, and a symbol R is the diameter of the tip portion 14*b* of the probe 14 at the height h of the object 11. The symbol R is the diameter of the tip portion 14*b* at the uppermost point Pm illustrated in FIG. 3, that is, the diameter of a region 14*d* of the tip portion 14*b* of the probe 14 illustrated in FIG. 4. In addition, hereinafter, the height h of the object 11 rising along the probe 14 is also simply referred to as the height h of the object 11.

$$\sigma \cdot 2\pi R \approx G \cdot \frac{h}{R} \cdot \pi R^2 \qquad \text{[Expression 1]}$$

Figure 5:
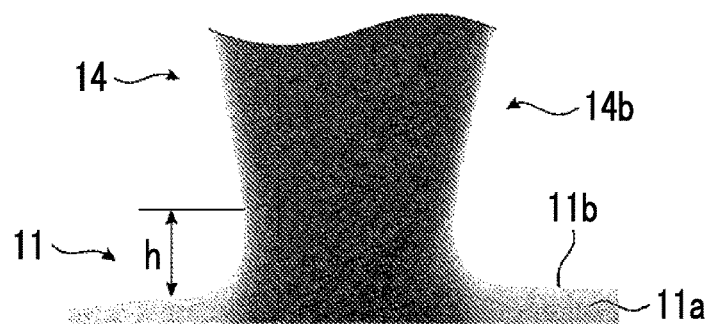
FIG. 5 is a schematic diagram illustrating an example of a measurement image of an elastic body in the physical property measurement method according to the embodiment of the invention.

The following expression can be obtained from the above-described expression. From the following expression, the shear modulus G can be obtained by using the height h of the object 11 rising along the probe 14 brought into contact with the object 11. In addition, an example of a measurement image is illustrated in FIG. 5. As illustrated in FIG. 5, the surface 11*b* of the object 11 is pulled up by the probe 14 in contact with the object 11.

$$h \approx 2\sigma/G \qquad \text{[Expression 2]}$$

$$G \approx 2\sigma/h \qquad \text{[Expression 3]}$$

In addition, in a case in which the object is a viscous fluid, considering the dynamics of the fluid rising along the surface of the probe 14 and considering that the surface tension and the viscous force compete, the time evolution of the height h of the object 11 can be linked to a physical property value. The pull-up speed of the meniscus is determined by the balance between surface tension and viscous force.

Figure 6:
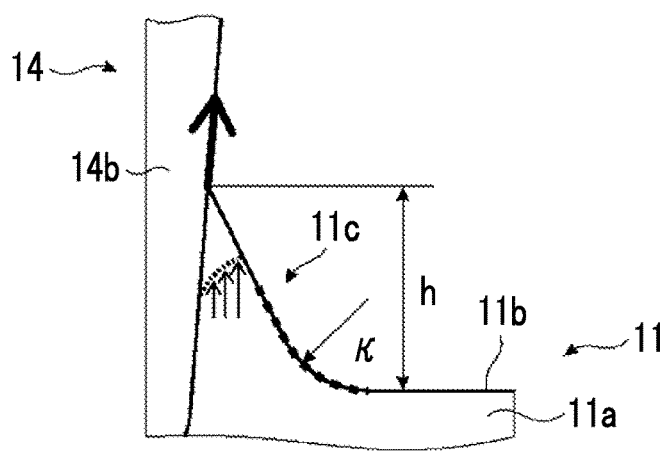
FIG. 6 is a schematic diagram illustrating a viscous liquid calculation model in the physical property measurement method according to the embodiment of the invention.

The balance between the surface tension and the viscous force is a balance in a case in which the object 11 is pulled up to the tip portion 14b of the probe 14 as illustrated in FIG. 6.

In addition, in the following expression, a symbol σ is surface tension, a symbol κ is meniscus curvature, a symbol η is viscosity, and a symbol R is the diameter of the tip portion 14b of the probe 14 at the height h of the object 11. A symbol t is time.

$$\frac{\sigma}{\kappa} \cdot \frac{1}{h} \approx \eta \frac{h}{R^2}$$ [Expression 4]

$$h \approx \sqrt{\frac{\sigma R^2}{\eta k}} \cdot \sqrt{t}$$ [Expression 5]

$$\eta \approx \frac{\sigma R^2}{h^2 k} t$$ [Expression 6]

Figure 7:
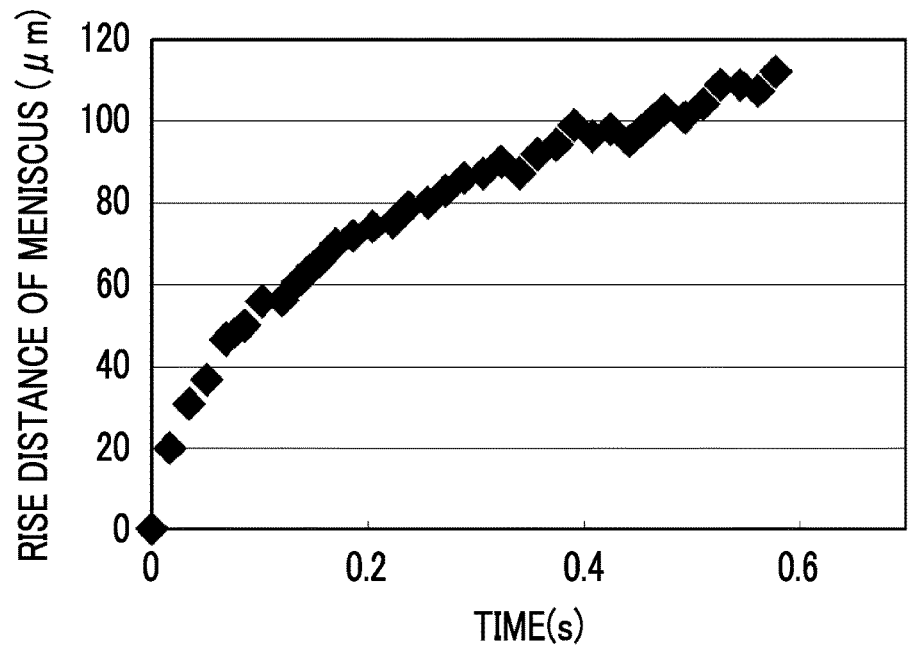
FIG. 7 is a graph illustrating a relationship between a rise distance of a meniscus and time in the physical property measurement method according to the embodiment of the invention.

Further, the rise distance of the meniscus and time have, for example, a relationship illustrated in FIG. 7. The rise distance of the meniscus in FIG. 7 is the height h of the object 11. In addition, the unit of time on the horizontal axis of FIG. 7 is seconds.

The measurement unit 18 measures the height h of the object 11 rising along the probe 14 brought into contact with the object 11 and the rise distance and time of the meniscus. The calculation unit 20 can calculate the viscosity of the surface layer portion 11a using the above-described expression.

It is specified whether the object 11 is an elastic body or a viscous fluid by the behavior of the object 11 in a case in which the tip portion 14b of the probe 14 penetrates the surface layer portion 11a of the object 11. For the viscous fluid, the time required for the object 11 to rise is longer than that for the elastic body, and the final rise distance is long and is equal to or greater than 60 µm.

For example, a change in the time required for the object 11 to rise may be measured, threshold values may be set for the time when the height h of the object 11 reaches its maximum and the maximum height h, and it may be specified whether the object 11 is an elastic body or a viscous fluid.

In a case in which it is known in advance whether the object 11 is an elastic body or a viscous fluid, it is possible to obtain an elastic modulus or viscosity, using any of the above-described expressions, according to physical properties.

(Physical Property Measurement Method)

Figure 8:
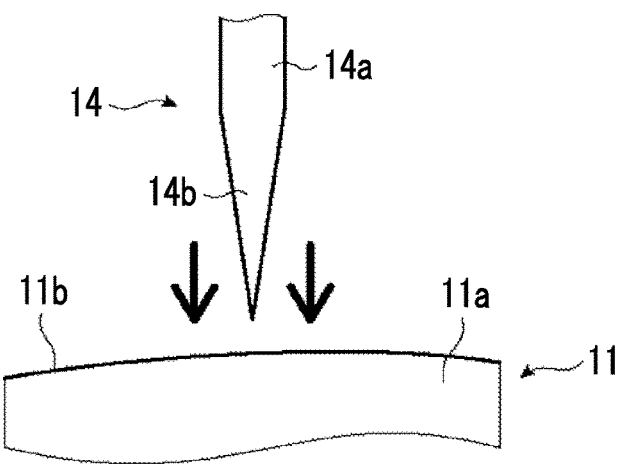
FIG. 8 is a schematic diagram illustrating the physical property measurement method according to the embodiment of the invention.
Figure 9:
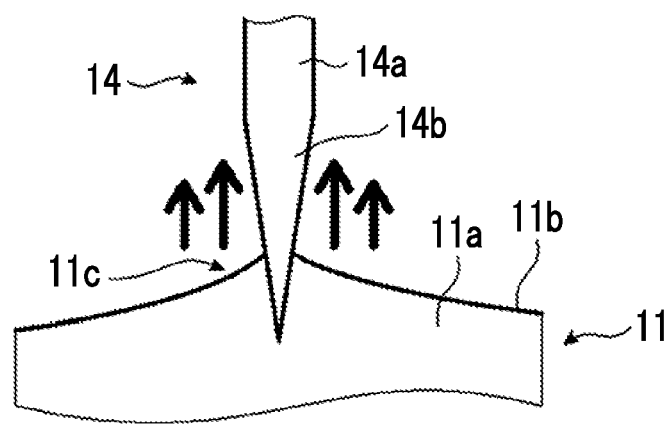
FIG. 9 is a schematic diagram illustrating the physical property measurement method according to the embodiment of the invention.

FIGS. 8 and 9 are schematic diagrams illustrating the physical property measurement method according to the embodiment of the invention in order of steps.

The physical property measurement method includes a step of bringing the probe 14 into contact with the surface layer portion 11a of the liquid or gel-like object 11 and maintaining the contact state, a step of measuring the height h (see FIG. 3) of the object 11 rising along the probe 14 in contact with the object 11, and a step of calculating the viscous properties or elastic properties of the surface layer portion 11a of the object 11, using the measured height h of the object 11 rising along the probe 14. In addition, the measured height h of the object 11 rising along the probe 14 is the height h of the object 11 rising along the probe 14 in contact with the object 11. In FIG. 3, the object 11 is brought into contact with the tip portion 14b of the probe 14 and rises along the tip portion 14b.

Further, the probe 14 is brought into contact with the surface layer portion 11a of the object 11 and the contact state is maintained as described above.

As illustrated in FIG. 8, the tip portion 14b of the probe 14 is brought close to the surface 11b of the object 11. As illustrated in FIG. 9, the tip portion 14b of the probe 14 is brought into contact with the surface layer portion 11a of the object 11. In this case, the object 11 rises along the tip portion 14b of the probe 14 due to the effect of surface tension, the surface 11b of the object 11 is pulled up. As a result, the meniscus 11c is formed. Then, for example, image analysis is used to measure the height h of the meniscus 11c of the object 11, that is, the height h of the object 11 rising along the probe 14 in contact with the object 11.

The viscous properties or elastic properties of the surface layer portion 11a of the object 11 are calculated using the measured height h of the object 11 and the above-described expression. In a case in which surface tension is known, the elastic modulus can be calculated by measuring the height h of the object 11.

Further, the viscous fluid behaves differently from the elastic body in that the meniscus 11c is formed. It is possible to calculate the viscosity of the viscous fluid as described above.

As described above, the physical property measurement method can measure various physical properties, such as the elastic modulus and viscosity of the surface layer portion 11a of the object 11, using the deformation of the object, without measuring the force acting on the probe 14. The physical property measurement method can easily measure the physical properties of the surface layer portion.

In addition, the physical property measurement method can measure the physical properties of the surface layer portion of the object in real time. Furthermore, the physical property measurement method uses the height h of the object 11 and can measure various physical properties, such as an elastic modulus or viscosity, in a wide dynamic range. The physical property measurement device 10 can also obtain the above-mentioned effect of the physical property measurement method.

In addition, as described above, in the physical property measurement method, in order to properly measure the physical properties of the surface layer portion 11a of the object 11, the probe 14 may penetrate the surface layer portion 11a to a depth of about 1/10 of the thickness of the surface layer portion 11a. As described above, the amount of penetration Dn of the probe 14 is 1/3 of the thickness of the surface layer portion 11a at most and is preferably equal to or less than 1/5 of the thickness of the surface layer portion 11a.

In addition, in the physical property measurement method, 1.8±0.2 kPa was obtained for urethane gel (elastic modulus G=3.3 kPa). Further, 2.1±0.2 kPa was obtained for urethane gel (elastic modulus G=5 kPa).

Furthermore, a viscosity η of 0.89±0.05 Pa·s was obtained for silicone oil (viscosity η=1 Pa·s).

Moreover, in a case in which a polymer, a colloidal solution, or the like is dried, the vicinity of the surface of the liquid is concentrated with the progress of the drying, and the physical properties of a surface layer change greatly as compared to a bulk. In particular, it is known that, in a case in which a solute exceeds critical concentration, mechanical properties change significantly and the physical properties change from liquid to solid, that is, gelation occurs.

Figure 10:
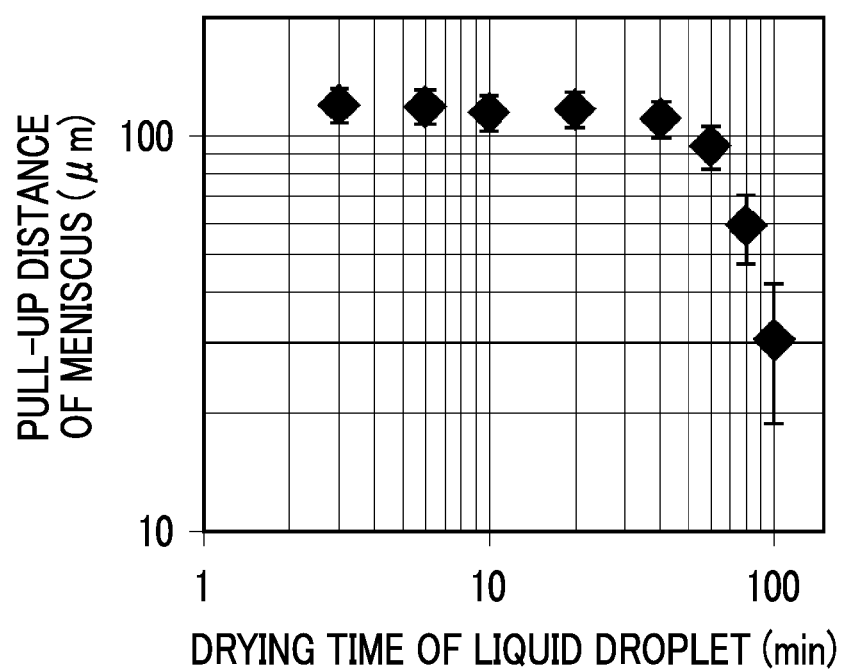
FIG. 10 is a graph illustrating a relationship between a pull-up distance of the meniscus of a liquid droplet and a drying time of the liquid droplet.

In order to verify whether it is possible to track changes in surface rheology associated with drying, a liquid droplet of a polyvinyl alcohol (PVA) aqueous solution was dropped as the object onto a polytetrafluoroethylene (PTFE) substrate. The liquid droplet had an initial concentration of 3.3 mass % and a volume of 6 microliters (µl). A change in the pull-up distance of the meniscus was examined in a case in which the probe 14 was brought into contact with the liquid droplet up to a depth of 20 to 30 µm from the surface of the liquid droplet while the liquid droplet was dried in the atmosphere (a temperature of 27±2° C. and a humidity of 65±5%). The results are illustrated in FIG. 10. In addition, the pull-up distance of the meniscus in FIG. 10 is the height h of the object 11. Further, the unit of the drying time on the horizontal axis of FIG. 10 is minutes.

As illustrated in FIG. 10, at the beginning of drying (drying time <50 minutes), the pull-up distance (height h of the object 11) of the meniscus on the surface of the liquid droplet hardly changed, and the surface of the liquid droplet behaved viscously. However, at a later stage of drying (drying time >60 minutes), the pull-up distance (height h of object 11) of the meniscus decreased sharply, and the surface of the liquid droplet behaved like an elastic film. The pull-up distance (height h of the object 11) of the meniscus at a drying time of 100 minutes was measured to be 32±5 m. In a case in which the elastic modulus was calculated using 50 mN/m as the surface tension of the solution, an elastic modulus G of 3.2 kPa was obtained. It was confirmed that a finite elastic modulus was developed on the surface of the liquid droplet and the liquid droplet was in a gel state.

(Another Example of Probe)

Figure 11:
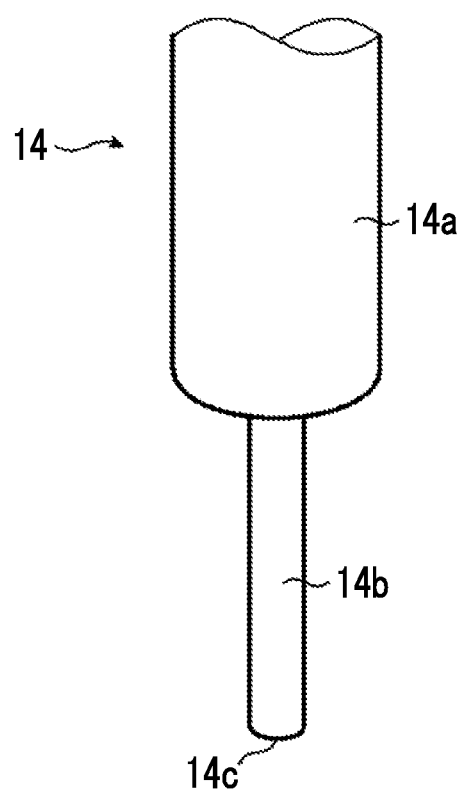
FIG. 11 is a schematic diagram illustrating another example of the probe that is used in the physical property measurement method according to the embodiment of the invention.

FIG. 11 is a schematic diagram illustrating another example of the probe used in the physical property measurement method according to the embodiment of the invention. In FIG. 11, the same components as those of the probe 14 illustrated in FIG. 2 are denoted by the same reference numerals, and the detailed description thereof will not be repeated.

The probe 14 illustrated in FIG. 11 has a tip portion 14b that is less sharp than that of the probe 14 illustrated in FIG. 2. The probe 14 illustrated in FIG. 11 has a base portion 14a and a tip portion 14b which have a cylindrical shape, and the tip portion 14b is thinner than the base portion 14a. The probe 14 penetrates the object 11 from the tip 14c of the tip portion 14b. In the probe 14 illustrated in FIG. 11, the diameters of the base portion 14a and the tip portion 14b change discontinuously, and there is a level difference between the base portion 14a and the tip portion 14b. In the probe 14 illustrated in FIG. 11, the diameter of the tip portion 14b is preferably equal to or less than 33 µm. Further, as described above, it is preferable that the curvature of the tip 14c of the probe 14 is equal to or less than 10 µm. Therefore, the diameter of the tip portion 14b is more preferably equal to or less than 10 µm.

In addition, it is preferable that the probe 14 illustrated in FIG. 11 is the same as the probe 14 illustrated in FIG. 2 except for the shape.

(Object)

The object is a liquid or gel-like object as described above. The object is not particularly limited. Examples of the object include inkjet ink, a liquid crystal coating film, a display material, a semiconductor material, such as resist, a material of a low refractive index, a capsule medicine, paint, cosmetics, food, a reaction-curing resin, an adhesive, and a building material such as concrete or mortar. Further, examples of the object also include microcapsules and cell membranes.

The invention is basically configured as described above. The physical property measurement method, the physical property measurement device, and the probe according to the invention have been described in detail above. However, the invention is not limited to the above-described embodiment, and various improvements and modifications can be made without departing from the scope of the invention.

EXPLANATION OF REFERENCES

10: physical property measurement device
11: object
11a: surface layer portion
11b: surface
11c: meniscus
12: stage
12a: surface
14: probe
14a: base portion
14b: tip portion
14c: tip
14d: region
16: driving unit
18: measurement unit
20: calculation unit
22: control unit
23: light source
24: imaging unit
25: analysis unit
Dn: amount of penetration
h: height
Pm: point

What is claimed is:

1. A physical property measurement method comprising:
a step of bringing a probe into contact with a surface layer portion of a liquid or gel-like object and maintaining a contact state;
a step of measuring a height of the object rising along the probe in contact with the object; and
a step of calculating a viscosity or an elastic property of the surface layer portion of the object using the measured height of the object rising along the probe and based on one of the following expressions:

$$\sigma \cdot 2\pi R \approx G \cdot \frac{h}{R} \cdot \pi R^2 \text{ and } \eta \approx \frac{\sigma R^2}{h^2 \kappa} t,$$

where σ represents a surface tension of the object, G represents a shear modulus of the surface layer portion of the object, R represents a diameter of a tip portion of the probe at the height of the object rising along the probe, h represents the height of the object as measured, κ represents a meniscus curvature of the surface layer portion of the object, η represents the viscosity, and t represents time in seconds.

2. The physical property measurement method according to claim 1,
wherein the probe extends linearly and has a base portion and the tip portion,
the tip portion is thinner than the base portion, and
the tip portion of the probe is brought into contact with the surface layer portion of the object.

3. The physical property measurement method according to claim 1, wherein a diameter of a thickest part in a portion of the probe which is in contact with the object is equal to or less than ⅓ of a thickness of the surface layer portion of the object.

4. The physical property measurement method according to claim 2, wherein, in the probe, a diameter of the tip portion decreases toward a side opposite to the base portion.

5. The physical property measurement method according to claim 2, wherein, in the probe, the base portion and the tip portion have a cylindrical shape, and the tip portion is thinner than the base portion.

6. The physical property measurement method according to claim 2, wherein a diameter of a thickest part in a portion of the probe which is in contact with the object is equal to or less than ⅓ of a thickness of the surface layer portion of the object.

7. The physical property measurement method according to claim 3, wherein, in the probe, a diameter of the tip portion decreases toward a side opposite to a base portion.

8. The physical property measurement method according to claim 3, wherein, in the probe, a base portion and the tip portion have a cylindrical shape, and the tip portion is thinner than the base portion.

9. A physical property measurement device that measures a viscosity or an elastic property of a surface layer portion of a liquid or gel-like object, the physical property measurement device comprising:
a stage on which the object is placed;
a probe that is configured to come into contact with the surface layer portion of the object;
a driving unit that is configured to bring the probe into contact with the surface layer portion of the object and maintain a contact state, or separates the probe from the surface layer portion;
a measurement unit that is configured to measure a height of the object rising along the probe in contact with the object; and
a calculation unit that is configured to calculate the viscosity or the elastic property of the surface layer portion of the object using the height of the object rising along the probe measured by the measurement unit and based on one of the following expressions:

$$\sigma \cdot 2\pi R \approx G \cdot \frac{h}{R} \cdot \pi R^2 \text{ and } \eta \approx \frac{\sigma R^2}{h^2 \kappa} t,$$

where $\sigma$ represents a surface tension of the object, G represents a shear modulus of the surface layer portion of the object, R represents a diameter of a tip portion of the probe at the height of the object rising along the probe, h represents the height of the object as measured, $\kappa$ represents a meniscus curvature of the surface layer portion of the object, $\eta$ represents the viscosity, and t represents time in seconds,
wherein the tip portion of the probe has a part whose diameter is equal to or less than 33 μm.

10. The physical property measurement device according to claim 9, wherein the probe extends linearly and has a base portion that is provided continuously with the tip portion, and a diameter of the tip portion decreases toward a side opposite to the base portion.

11. The physical property measurement device according to claim 9, wherein the probe extends linearly and has a base portion that is provided continuously with the tip portion, the base portion and the tip portion have a cylindrical shape, and the tip portion is thinner than the base portion.

* * * * *